United States Patent [19]

Novosad

[11] Patent Number: 4,779,876
[45] Date of Patent: Oct. 25, 1988

[54] DRIVE FOR BANDED WASHER TYPE SEAL

[75] Inventor: Eugene Novosad, Arlington Heights, Ill.

[73] Assignee: John Crane-Houdaille. Inc., Morton Grove, Ill.

[21] Appl. No.: 48,072

[22] Filed: May 11, 1987

[51] Int. Cl.⁴ .............. F16J 15/36; F16J 15/38
[52] U.S. Cl. ................... 277/81 R; 277/22; 277/26; 277/815; 277/92; 277/88
[58] Field of Search ............ 277/22, 26, 81 R, 81 S, 277/88–90, 92, 93 R, 93 SD

[56] References Cited

U.S. PATENT DOCUMENTS

| | | | |
|---|---|---|---|
| 2,806,720 | 9/1957 | Meyer | 277/92 X |
| 2,917,329 | 12/1959 | Laser | 277/26 |
| 2,937,039 | 5/1960 | Santapa | 277/26 |
| 2,948,555 | 8/1960 | Wright | 277/26 |
| 2,995,390 | 8/1961 | Gardner | 277/26 |
| 3,480,284 | 11/1969 | Voitik | 277/26 |
| 3,782,735 | 1/1974 | Novosad | 277/22 |
| 3,895,811 | 7/1975 | Richard et al. | 277/22 |

FOREIGN PATENT DOCUMENTS

| | | | |
|---|---|---|---|
| 756725 | 9/1956 | United Kingdom | 277/81 S |
| 941849 | 11/1963 | United Kingdom | 277/81 S |

Primary Examiner—Robert S. Ward
Attorney, Agent, or Firm—Kinzer,Plyer,Dorn,McEachran & Jambor

[57] ABSTRACT

An improved drive for a banded sealing ring or washer in a rotary mechanical seal. The washer, usually a ceramic washer, is provided with an annular band surrounding its outer periphery which includes an outwardly extending flange. The seal includes a sleeve mounted on a rotatable shaft of a pump, which houses the washer in coaxial relation. It further includes a flange extending radially, which defines means in contact with the band of the washer, such that driving engagement is effected between the sleeve flange and the washer band and the washer is caused to rotate with the sleeve.

20 Claims, 2 Drawing Sheets

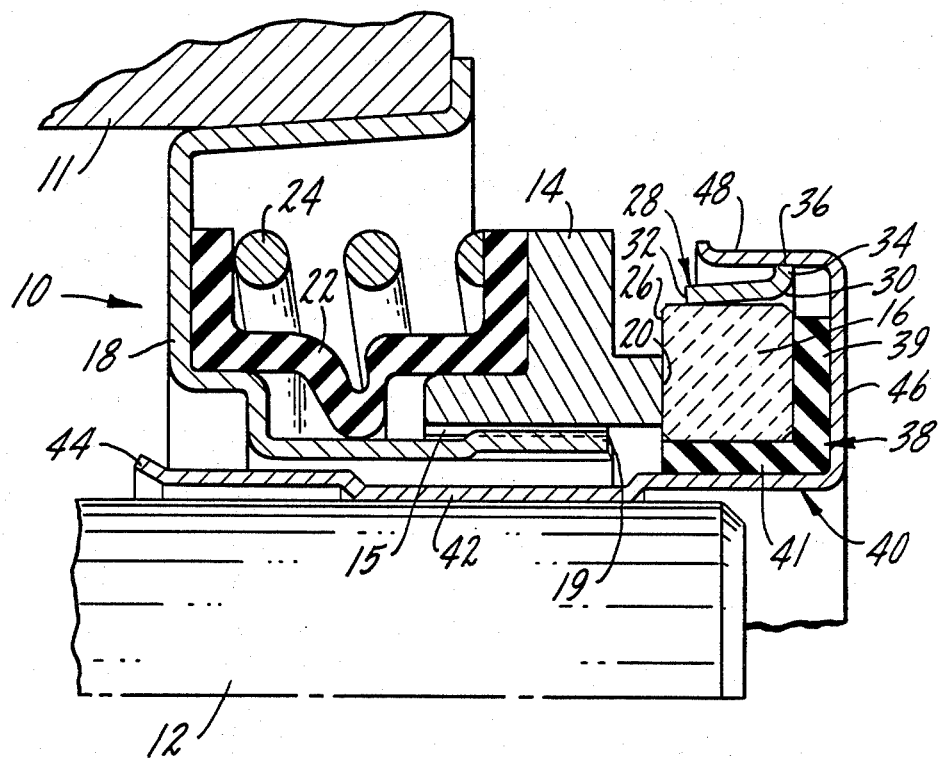
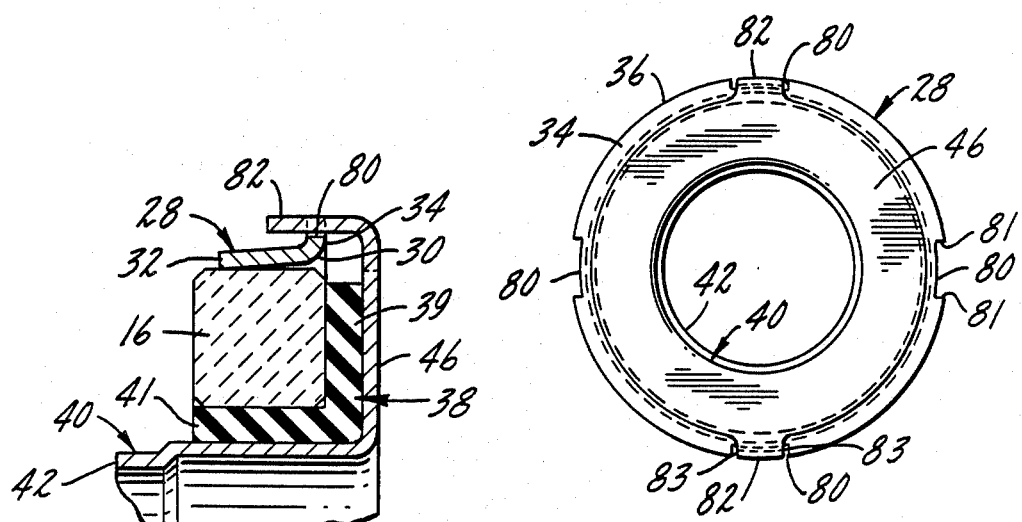

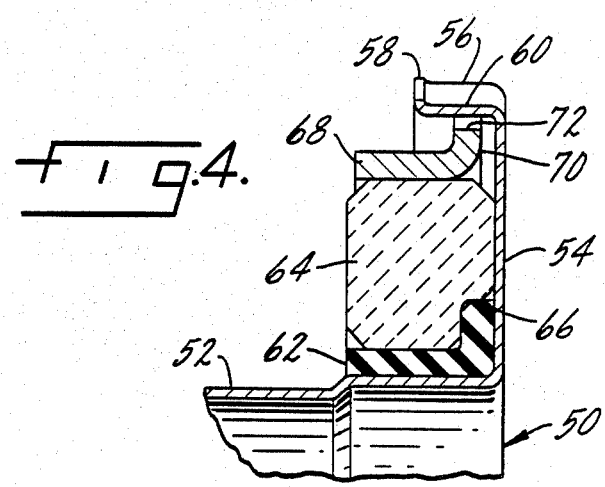
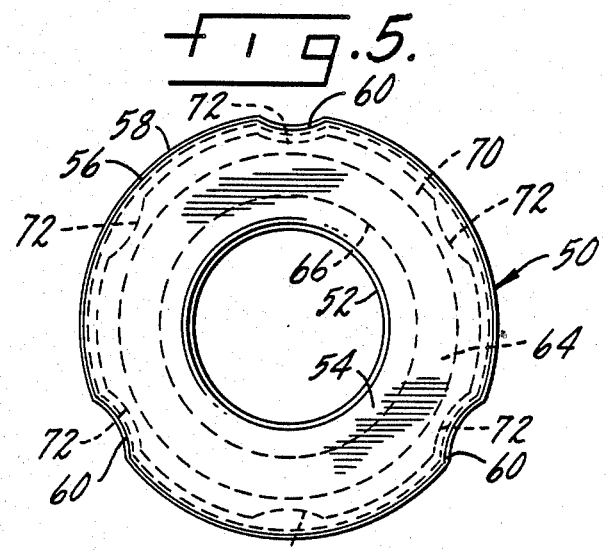
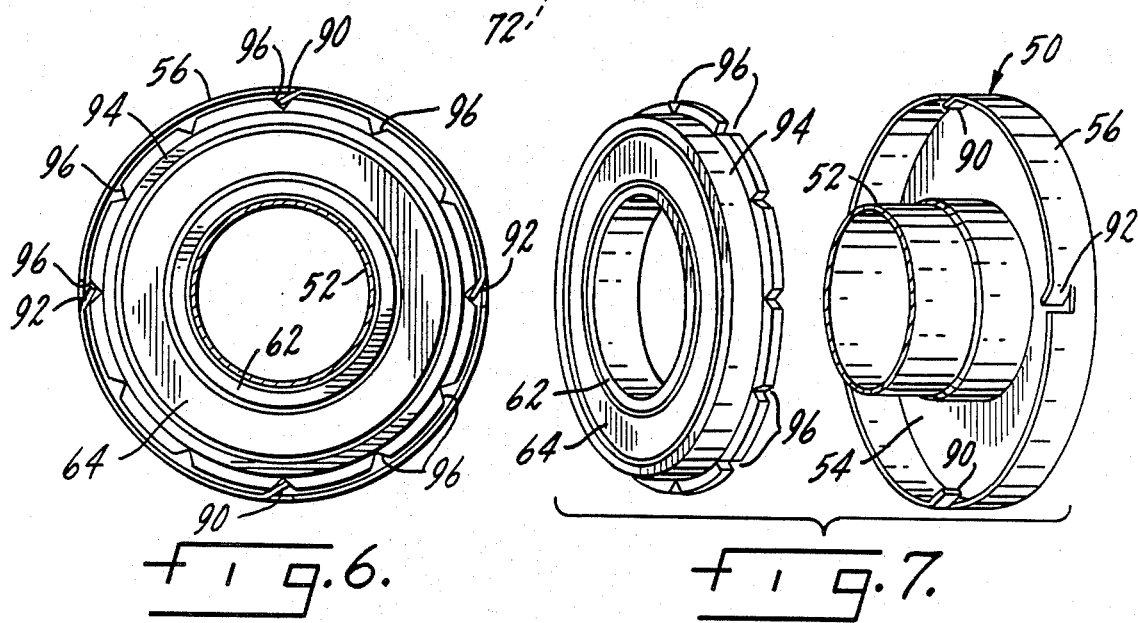

DRIVE FOR BANDED WASHER TYPE SEAL

BACKGROUND OF THE INVENTION

The present invention relates to rotary mechanical seals used to prevent leakage of fluids along a shaft rotatable in a housing. Such seals utilize a pair of contacting washers: one annular washer or ring is sealed with respect to the shaft and rotates with the shaft; the other is sealed with respect to a housing and is stationary. The device of the present invention provides an improved drive to the rotatable washer to insure that the washer rotates with the rotation of the shaft.

Rotary mechanical seals are known and are particularly useful in a variety of applications, for example, in coolant pumps in the cooling systems of internal combustion engines. In such seals, one of the sealing washers is typically made of a hard, rigid material such as ceramic. In this application, the coolant may be subject to sudden and extreme temperature changes which subject the ceramic washer to thermal shock; the washer may expand unevenly, causing it to crack and the seal to fail.

To solve the thermal shock problem, U.S. Pat. No. 3,782,735, to Novosad, discloses the use of a metal band around the ceramic washer. The metal band has an interference fit with the ceramic washer at one end. At its opposite end, the band defines a radially directed annular fin. Because of the interference fit between the ceramic washer and the metal band, the ceramic washer is in a constant state of compression, thereby increasing the washer's resistance to thermal shock. The annular fin aids in dissipating heat from the ceramic washer into the fluid being pumped.

In the arrangement disclosed in Novosad U.S. Pat. No. 3,782,735 the ceramic washer is carried by a sleeve pressed onto the shaft. An elastomeric washer is disposed between the sleeve and the washer to provide a static seal and also to provide a means for driving the washer. While the rotary mechanical seal disclosed in Novosad U.S. Pat. No. 3,782,735, protects the ceramic washer from thermal shock, ceramic washers driven solely by this frictional connection between the washer and sleeve may, in some instances, spin relative to the pump shaft. To insure against this possibility, the present invention provides a rotary mechanical seal which uses an improved drive to rotate the ceramic washer.

SUMMARY OF THE INVENTION

The seals of the present invention are particularly useful as seals in coolant pumps in the cooling systems of internal combustion engines. The driven ring is arranged with means to both protect the seal from damage due to the thermal shock and to insure that the rotating seal element rotates with the shaft.

The present invention provides a rotary mechanical seal of the type disclosed in U.S. Pat. No. 3,782,735. It includes a banded ceramic washer which rotates with the shaft and cooperates with a second washer which is stationary to establish relatively rotating contacting seal faces. The ceramic washer is banded in accordance with the principles of the aforesaid patent.

A sleeve is press-fit coaxially onto a shaft and adapted to rottte with the shaft. A cylindrical body portion, coaxial with the shaft, receives the banded washer. A flange extends radially from the body, and defines means to engage the metal band of a banded sealing washer adjacent the outer periperal diameter of the band. The band includes cooperating means which is engaged by the means on the sleeve.

Description Of The Drawings

FIG. 1 is an axial section, through one embodiment of an illustrated rotary mechanical seal made in accordance with the principles of the present invention.

FIG. 2 is a partial axial section, of a second embodiment of an illustrative rotary mechanical seal.

FIG. 3 is an end view of the rotary mechanical seal as viewed from the right side of FIG. 2.

FIG. 4 is a view similar to FIG. 2, showing a further alternate embodiment of a rotary mechanical seal.

FIG. 5 is an end view of the rotary mechanical seal as viewed from the right side of FIG. 4.

FIG. 6 is an end view of a further alternate embodiment, looking in the direction opposite to the view of FIG. 5.

FIG. 7 is a partially exploded perspective view of the seal of FIG. 6.

DETAILED DESCRIPTION OF THE ILLUSTRATED EMBODIMENT

Rotary mechanical seals having banded sealing washers and embodying the principles of the present invention are illustrated in the accompanying drawings. Several aspects of the illustated rotary mechanical seal are disclosed in U.S. Pat. No. 3,782,735 to Novosad, the disclosure of which is incorporated by reference herein.

The seal, generally designated 10 is intended to provide a liquid tight seal between housing 11 and shaft 12, of a pump or other device. It is mounted coaxially, on shaft 12. The seal 10 uses two relatively rotating contacting washers 14, 16 which define running seal surfaces, defining stationary and rotating sealing surfaces. One washer 14 is mounted for non-rotative but limited axial movement; the other washer 16 is rotatable, with the pump shaft 12 and is in fixed axial position. The parts could however be reversed, with the axially moveable washer connected to the rotatable shaft.

The non-rotating washer 14 is mounted in a metal retainer 18, which is press-fit into a bore of the pump housing 11. The retainer 18 is sealed with respect to the pump housing by the press-fit of the retainer in the housing. The washer 14 defines a flat, smooth, radially disposed sealing surface 20 on one side. The opposite side of the washer 14 bears against a flexible resilient bellows member 22 extending between the ring or washer 14 and the metal retainer 18. A spring 24 is interposed between the two ends of the bellows member 22, and effects a fluid-tight seal between the retainer 18 and the washer 14. The spring 24 also biases the sealing surface 20 of the first washer 14 against the rotatable washer 16. Ring 14 includes a series of grooves 15 at its inside diameter defined by partially cylindrical surfaces. Sleeve 18 includes mating detents 19 which extend into grooves 15 and fix ring 14 against rotation but permit axial movement along the shaft 12.

The sealing surface 20 of the non-rotating washer 14 bears against a similar flat, smooth, radially disposed sealing surface 26 of the rotatable washer 16. The rotatable washer 16, is preferably made of a ceramic material. To obviate thermal shock problems, the perimeter of the rotatable washer 16 is circumscribed by a metal band 28 as described in U.S. Pat. No. 3,782,735.

The metal band 28 is annular and one end 30 is of a larger diameter than opposite end 32 and tapers to provide an interference fit around the washer 16 at end 32. The oversized end is flared outwardly to form a short radial fin or flange 34. The fin 34 defines an axial edge surface 36 at its perimeter or outer periphery.

Sleeve 40 includes a cylindrical body 42 frictionally mounted coaxilly on the pump shaft 12 for rotation with the shaft. The interference between the sleeve 40 and the shaft 12 should be a minimum of 0.001 inch. At one end 44 of sleeve 40 proximate to the metal retainer 18, the body is enlarged away from the shaft 12. The flared end 44 engages the metal retainer 18 when the seal is not installed in a pump wall to form a unitary seal package. When installed the retainer engages the housing and is fixed in an axial position, further axial movement of sleeve 40 moves flared end 44 away from the retainer causing compression of spring 24. In this manner a predetermined load may be placed on the seal faces during installation.

At its opposite end sleeve 40 includes a radial flange 46 extending radially from the sleeve body. Flange 46 is provided with an integral, annular, axially-directed wall 48 extending axially toward the non-rotating washer 14 concentric with and overlying body 44.

A flanged flexible resilient ring 38 is interposed between the banded rotatable washer 16 and sleeve 40 to seal against fluid leakage. It is made of an elastomer and includes radial portion 39 and axial portion 41. The sleeve body 42, flange 46, and axial annular wall encircle the banded washer 16. The resilient ring 38 provides a static seal therebetween.

The resilient ring 38 and banded washer 16 are sized such that the ring 38 is compressed into the space defined by the sleeve body 42, flange 46, and upon the inner surface of sleeve 40 and wall 48. As shown in the drawing, the resilient ring or washer 38 bears against the inner surfaces of the sleeve 42 body and flange 46. This arrangement provides a frictional drive path between the sleeve 42 and ring 16.

In accordance with the present invention, the fin or flange 36 of the metal band 28 and the inner diameter of axial wall 48 are sized such that surface 36 contacts the inner surface of the axial wall 48, and is frictionally engaged therewith. This fricical engagement of the metal band 28 and sleeve wall 48 provides sufficient drive torque to insure rotation of the rotatable washer 16 and prevent spinning relative to the sleeve 40 and shaft 12. A minimum of 0.001 inch interference is provided between the outer diameter of the surface 36 and the inner diameter of axial wall 48 to insure frictional drive.

With the rotary mechanical seal assembled as described above, the banded washer 16 is held between the sleeve wall 48 and the resilient ring 38. Because of the compression of the ring 38, washer 16 will be driven by sleeve 40 through ring 38 and also through frictional engagement of axially-directed wall 48 with axial edge surface 36 of flange 34. The drive torque thus provided is greater than that provided by the resilient ring 38, alone. Thus, the contacting surfaces of the extension and band fin provide a means for driving the rotatable washer, and thereby, the present invention serves to prevent the washer from spinning relative to the sleeve 40 or pump shaft 12.

Another embodiment of the present invention is illustrated in FIGS. 2 and 3. In the embodiment illustrated in FIGS. 2 and 3, the metal band 28 includes radial flange 34 and axial edge surface 36. In this embodiment however, flange 34 also includes a plurality of slots or notches 80 disposed on the outer circumference of the flange 34 of band 28. The slots define pairs of generally parallel driven surfaces 81.

In this embodiment, the integral flange 46 of sleeve 40 is radially directed as in the prior embodiment. However, instead of a radial wall concentric with sleeve 40, it includes a plurality of axial drive lugs 82 which extend toward the opposite end 44 of the sleeve. Each defines a pair of generally radial drive surfaces 83 disposed between driven surfaces 81.

As illustrated in FIG. 3, the illustrated embodiment discloses a metal band 28 including four slots or notches 80 disposed 90° apart. The flange 46 of sleeve 40 has only one pair of diametrically opposed lugs 82. Any desired number of slots and lugs may be used, so long as a positive connection between the band 28 and sleeve 40 is achieved.

With the lugs 82 disposed in the slots or notches 80, the engagement of drive surfaces 83 with driven surfaces 81 causes positive drive of the banded washer 16, thereby preventing the banded washer from spinning relative to the shaft 12. This is true regardless of the direction of rotation of the shaft. Significantly, this arrangement of positive drive does not impart any compressive force upon the ceramic washer 16. This latter arrangement also has the advantage of being suitable for use with a seal ring which is axially movable along shaft 12. The lugs 82 need only be made long enough to ensure engagement of lugs 82 with slots 80 throughout the extent of axial travel of the ring along the shaft.

FIGS. 4 and 5 illustrate a further alternate arrangement for providing a positive drive between a sleeve and rotatable washer. This form of the sleeve 50 includes a body 52 adapted to be press fit on the end of a shaft as in the previous embodiments. The outer end of the sleeve 50 has a radial flange 54 which extends to an integral, annular, axially-directed wall 56 spaced from sleeve body 52. An outwardly flaring lip 58 is formed along the inside edge of the wall 56. Three detents or crimps 60 are formed in the wall 56 and extend radially inwardly therefrom. In the illustrated embodiment the detents are formed as a semi-cylindrical surface, any number of alternate shapes, however, could be used.

A resilient ring 62 having a foreshortened radial portion mounts the ceramic rotatable washer 64. The washer has an annular groove 66 for receiving the radial portion of resilient ring 62. The portion of the washer 64 beyond the grove 66 engages the inner surface of the flange 54.

A metal band 68 similar to the band 28 extends around the periphery of the washer 64. Band 68 has a radial fin or flange 70 at its edge underneath the wall 56. Arcuate grooves or cutouts 72 are formed at spaced locations around the flange 70. The detents 60 mate or cooperate with the grooves 72, as best seen in FIG. 5, to positively engage the sleeve 50 and metal band 68 for rotation. This provides a drive for the band, and thus the washer 64, for rotation of the washer with the shaft.

FIGS. 6 and 7 illustrate yet another alternate means for positively driving the rotatable washer. Here the sleeve 50 is essentially the same as that in FIGS. 4 and 5 with the exception that detents 60 are replaced by two sets of tabs 90 and 92. Each set has two tabs formed 180° apart in the axially-directed wall 56. The tabs extend inwardly from the annulus of the wall 56. The tabs of one set, 92, are directed toward a clockwise direction. The tabs 90 of the other set are directed in a counterclockwise direction. The drive therefore is suitable for either direction of rotation of the shaft.

A metal band 94 similar in shape and function to the band 28 of the embodiment of FIGS. 1 to 3 encircles a ceramic washer 64. In this embodiment the fin 34 has a series of axial grooves or notches 96 on its outer surface. Tabs 90 and 92 engage the notches 96 to provide a positive drive between the sleeve and washer. As can be appreciated, in a particular application with a known direction of rotation only one tab 90 or 92 and one notch 96 could suffice.

Additional modifications and/or additions may be included by those skilled in the art without departing from the scope of the invention as defined by the claims.

I claim:

1. In a rotary mechanical seal having a sleeve for mounting upon a rotatable shaft for rotation therewith, an annular seal washer defining a radial sealing face, and mounted on said sleeve for rotation, therewith, and an annular band circumscribing said washer, said sleeve including means engaging said band to impart rotational effort to said washer through said band, wherein said sleeve includes an annular body adapted to frictionally engage a rotatable shaft, said sleeve further includes a radial flange, said flange includes an annular axial wall concentric with and overlying said body, said washer is disposed intermediate said body and said annular axial wall, said band circumscribing said washer including a generally radial flange having an axial edge, said edge frictionally engaging said axial wall of said sleeve.

2. In a mechanical seal having a sleeve for mounting upon a rotatable shaft for rotation therewith, an annular seal washer defining a radial sealing face, and mounted on said sleeve for rotation, therewith, and an annular band circumscribing said washer, said sleeve including means engaging said band to impart rotational effort to said washer through said band, wherein said sealing washer is made of ceramic, wherein said sleeve includes an annular body adapted to frictionally engage a rotatable shaft, said sleeve further includes a radial flange, said flange includes at least one axially directed lug, said washer is disposed intermediate said body and said axially directed lug, said band circumscribing said washer includes a generally radial flange having at least one notch formed therein, said lug defining at least one drive surface, said notch defining at least one driven surface, said lug disposed in said opening with said drive surface disposed for engagement with said driven surface to provide positive driving engagement between saidbband and said sleeve.

3. A rotatable mechanical seal as claimed in claim 2, wherein said sleeve includes a plurality of lugs and said band includes a plurality of notches, each said lug defining at least one drive surface and each said notch defining at least one driven surface disposed in one of said notches with said drive surface disposed for driving engagement with said driven surface to provide driving engagement between said sleeve and said band.

4. In a rotatable mechanical seal as claimed in claim 3, wherein said lugs and openings are equally circumferentially spaced.

5. In a rotatably mechanical seal as claimed in claim 2, wherein said flange of said band includes at least one peripheral cutout notch defining said driven surface said drive surface on said lug and said driven surface on said band being generally radially directed.

6. In a rotary mechanical seal as claimed in claim 1 wherein a resilient ring is disposed between said washer and said body, said body and said washer being sized such that said washer is compressed therebetween and is in sealing engagement with each said body and said washer.

7. In a rotary mechanical seal as claimed in claim 3 wherein a resilient ring is disposed between said washer and said body, said body and said washer being sized such that said washer is compressed therebetween and is in sealing engagement with each said body and said washer.

8. In a rotary mechanical seal as claimed in claim 4 wherein said notches and lugs are disposed in diametrically opposed pairs.

9. In a rotary mechanical seal as claimed in claim 8 wherein said band includes two pairs of said notches and said flange includes one pair of said lugs.

10. A rotary mechanical seal having a sleeve for mounting upon a rotatable shaft for rotation therewith, an annular seal washer defining a radial sealing face, and mounted on said sleeve for rotation, therewith, and an annular band circumscribing said washer, said sleeve including means engaging said band to impart rotational effort to said washer through said band, where the sleeve has an annular body engageable with the rotatable shaft and a radial flange connected to the body, the flange further having an annular axial wall which has at least one radially extending detent therein, the axial wall being concentric with and overlying said body and spaced therefrom with the washer disposed intermediate the body and axial wall, and the annular band includes a radial flange having at least one groove therein cooperating with the detent to provide positive driving engagement between the sleeve and the band.

11. A rotary mechanical seal as claimed in claim 10 wherein said annular axial wall of said flange of said sleeve includes three radially extending detents, equally spaced and said flange of said annular band includes three grooves therein each cooperating with one of said detents.

12. In a rotary mechanical seal as claimed in claim 10 wherein said detent is formed as a semicylindrical surface and said at least one groove in said flange of said band is arcuately shaped to mate with said at least one detent.

13. In a rotary mechanical seal as claimed in claim 11 wherein each of said detents is formed as a semicylindrical surface and each of said grooves in said flange of said band is arcuately shaped to mate with one of said detents.

14. In a rotary mechanical seal having a sleeve for mounting upon a rotatable shaft for rotation therewith, an annular seal washer defining a radial sealing face, and mounted on said sleeve for rotation, therewith, and an annular band circumscribing said washer, said sleeve including means engaging said band to impart rotational effort to said washer through said band, wherein said sleeve includes an annular body adapted to frictionally engage a rotatable shaft, and a radial flange connected to the body, said flange further having an annular axial wall which has at least one inwardly extending tab therein, the axial wall being concentric with and overlying said body and spaced therefrom with the washer disposed intermediate the body and axial wall, and the annular band includes at least one notch therein engaged by said tab to provide positive driving engagement between the sleeve and the band.

15. In a rotary mechanical seal as claimed in claim 14 wherein said annular axial wall of said flange of said sleeve includes two oppositely directed spaced apart tabs, and said flange of said annular band includes at least two notches each one of which is engaged by one of said tabs.

16. In a rotary mechanical seal as claimed in claim 15 wherein said annular axial wall of said flange of said sleeve includes two spaced apart pairs of tabs, the tabs of each pair being oppositely directed, and wherein said flange of said annular band includes at least four notches each one of which is engaged by one of said tabs.

17. In a rotary mechanical seal as claimed in claim 16 wherein the tabs of each pair are spaced approximately 180° apart.

18. In a rotary mechanical seal as claimed in claim 1 wherein said sealing washer is made of ceramic.

19. In a rotary mechanical seal as claimed in claim 10 wherein said sealing washer is made of ceramic.

20. In a rotary mechanical seal as claimed in claim 14 wherein said sealing washer is made of ceramic.

* * * * *